United States Patent
Vander Lugt

[15] 3,652,144
[45] Mar. 28, 1972

[54] AMPLITUDE WEIGHTING IN HOLOGRAPHY

[72] Inventor: Anthony Vander Lugt, Saline, Mich.
[73] Assignee: Radiation Incorporated, Palm Bay, Fla.
[22] Filed: Sept. 9, 1970
[21] Appl. No.: 70,856

[52] U.S. Cl. ................................. 350/3.5, 350/162 SF
[51] Int. Cl. .......................................... G02b 27/22
[58] Field of Search ........................ 350/3.5, 162 SF

[56] References Cited

UNITED STATES PATENTS 3,608,992  9/1971  Phelps et al. ........................ 350/3.5

OTHER PUBLICATIONS

Lohmann et al., 25A Physics Letters 570– 571 (10/1967)
Stroke et al., 7 Japanese Journal of Applied Physics 764– 766 (7/1968)
Murata et al., 7 Japanese Journal of Applied Physics 301– 302 (3/1968)
Pennington, II IBM Tech. Disc. Bulletin 322 (8/1968)

*Primary Examiner*—David Schonberg
*Assistant Examiner*—Robert L. Sherman
*Attorney*—Donald R. Greene

[57] ABSTRACT

Holographic system in which the signal (object) beam, the reference beam, or the readout beam is weighted (i.e., shaped) in amplitude as a function of the spatial coordinates of the hologram plane. Either the reference beam or the signal beam may be weighted in accordance with the light distribution of the signal beam to provide smaller variation in modulation, or unity modulation, for the various spatial frequencies in the signal beam over the entire area of the hologram. The readout beam may be shaped or weighted to further compensate for the variation in diffraction efficiency caused by the interaction of the residual variations in the modulation level and the nonlinearities of the recording medium.

12 Claims, 3 Drawing Figures

INVENTOR
ANTHONY VANDER LUGT

BY Young and Tarolli
ATTORNEYS 3,652,144

AMPLITUDE WEIGHTING IN HOLOGRAPHY

The present invention relates to holography and, more particularly, to holograms constructed near or in the Fourier transform plane.

It is an object of the present invention to provide a new and improved method and apparatus for constructing a hologram, particularly a Fourier transform, or near Fourier transform hologram, in which the signal beam and reference beam have approximately the same amplitude distribution in the recording plane.

A further object of the present invention is to provide a new and improved holographic method which reduces degradation in the reconstructed beam on reconstruction because of factors such as non-linearity of the recording medium and the wide range of amplitudes usually present for the various spatial frequencies in the signal beam.

Another object of the present invention is to compensate for the effect of non-linearities in the hologram, such as non-linearity in the response of the recording medium and insufficient dynamic range, by weighting the amplitude of the readout beam.

Yet another object of the present invention is to provide a new and improved method and apparatus for constructing a hologram, particularly a Fourier hologram, in which the quality of the recording is improved by weighting the signal or the reference beam approximately in accordance with the amplitude of the spatial frequencies of the signal beam.

A further object of the present invention is to provide a new and improved method and apparatus for making a holographic recording, particularly a Fourier transform recording, which lessens the normal variation in modulation of the reference beam for different spatial frequencies.

Further objects and advantages of the present invention will be apparent from the following detailed description of the present invention made with reference to the accompanying drawing forming a part of the present specification for all subject matter disclosed therein and in which.

Figure 1:
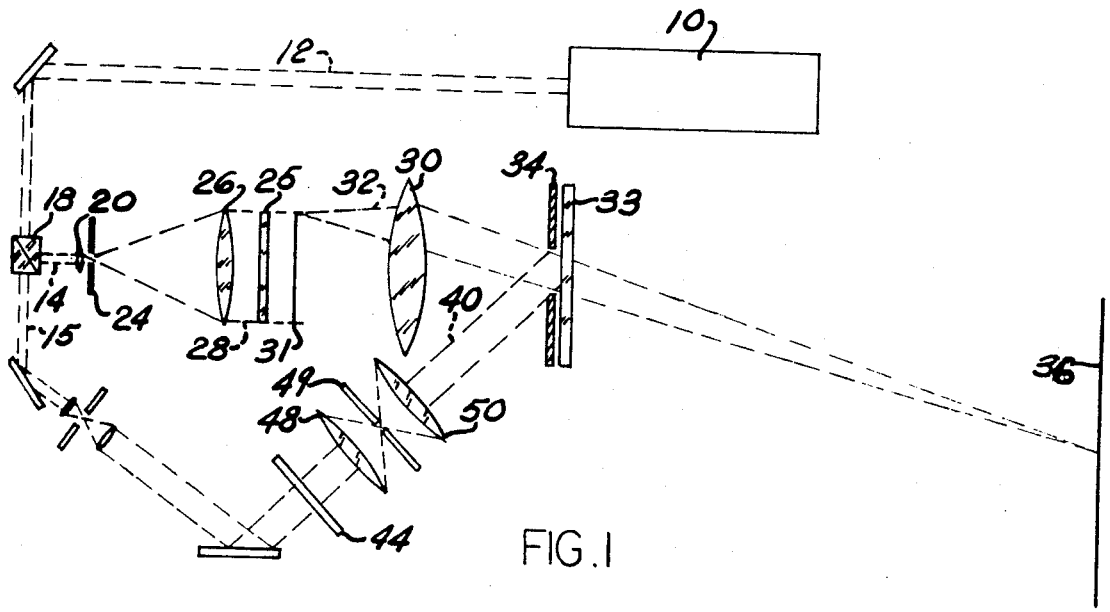
FIG. 1 is a diagrammatic showing of a specific holographic recording system for practicing the preferred embodiment of the present invention.

Referring to FIG. 1, a laser 10 provides a light beam 12 which is split into two beams 14, 15 by a beam splitter 18. The beam 14 passes through a focusing lens 20 and a pinhole plate 24 located in the focal plane of the lens 20. The beam diverges from the pinhole in the plate 24 and passes through a collimating lens 26 which forms a collimated light beam 28 which then illuminates an object, a transparency 31 in the illustrated embodiment, to form an object beam or signal beam 32 containing the information to be holographically recorded. A diffuser or self imaging grating 25 may optionally be employed between lens 26 and transparency 31. A lens 30 in the object beam images the object with magnification at an image plate 36.

As is well known in the art, there is a plane in which the light distribution in the focused signal beam is the Fourier transform of the light from the object plane and a recording made in or near this plane is termed a Fourier transform hologram. For purposes of simplification, the term Fourier transform hologram is used in this application to indicate holograms made in the Fourier transform plane or sufficiently near the plane to essentially maintain the characteristics of a Fourier transform hologram.

In accordance with the preferred embodiment of the present invention, a holographic recording medium 33 is placed in the Fourier transform plane and a collimated reference beam 40 is caused to interfere with the signal beam to establish interference fringes which are recorded on the recording medium. The recording medium is exposed through an aperture plate 34.

Figure 2:
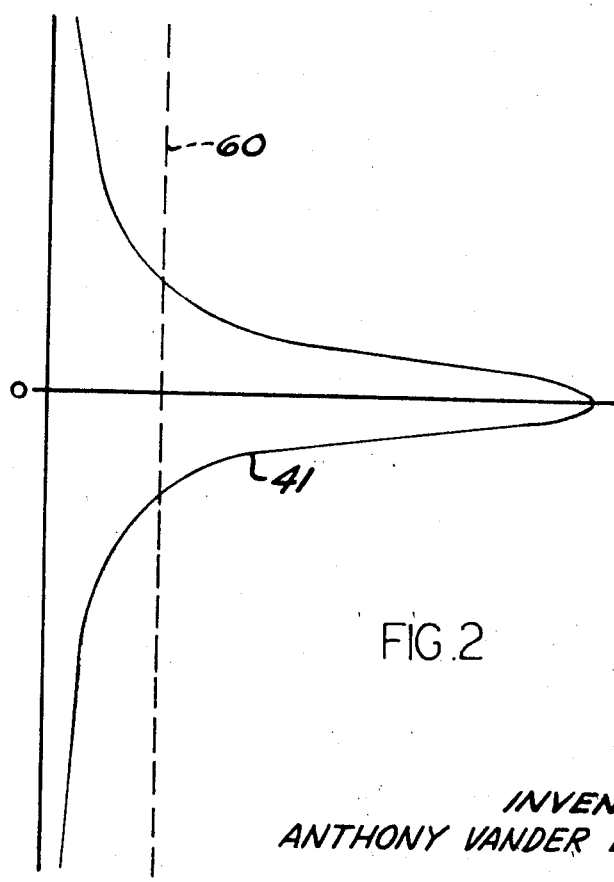
FIG. 2 is a diagram showing the modulus of a signal spectrum in the Fourier transform plane as a function of the spatial frequency.

In FIG. 2 a diagram 41 shows a relative distribution of light in the Fourier transform plane for the Fourier transform of a particular object. The abscissa of FIG. 2 represents the amplitude of the light while the ordinate indicates the distance from the optical axis.

As is well known, the light amplitude in the transform plane is a function of $x$ and $y$ coordinates of the transform plane. The light which is displaced from the axis of the lens is due to the higher spatial frequencies of the signal while the light amplitude in the vicinity of the axis of the lens is due to the lower spatial frequency signals.

As illustrated in FIG. 2, the amplitude of the low spatial frequencies in a typical Fourier transform is considerably greater than the amplitude of the higher spatial frequencies.

In the embodiment of the present invention, illustrated in FIG. 1, the reference beam is shaped to provide a light distribution at the recording medium which approximately corresponds to the light distribution of the signal beam to provide approximately unity modulation of the reference beam by the signal beam. As illustrated in FIG. 1, a mask 44 is placed in the reference beam. The transmittance characteristics of the mask is also a function of the $x$ and $y$ coordinates of the mask and is such that the light distribution for the reference beam at the recording medium approximately corresponds to that of the signal beam.

The mask 44 may be made by exposing photographic film to a Fourier transform signal beam from a typical object without interference with a reference beam. The film is then developed, if it is not self-developing, to provide a mask having transmittance characteristics which correspond to the light distribution of the signal beam at the recording medium. With the mask in position in the collimated reference beam, the amplitude of the reference beam as a function of the coordinates at the recording medium will correspond to the signal beam. A neutral density filter may be positioned in the beam 15 from the beam splitter to adjust the peak magnitude of the reference beam to provide unity modulation at the recording medium for the various spatial frequencies in the signal beam.

When photographic film is used as a transmission mask, the grain of the film introduces higher spatial frequencies which are a noise factor in the reference beam. Preferably, a spatial filter is used to filter these frequencies from the reference beam. To accomplish this, a focusing lens 48 is placed in the reference beam with the mask 44 located in the front focal plane of the lens. A spatial filter 49 is placed in the Fourier transform plane to block the higher spatial frequencies from the mask 44 so that the reference beam at the recording medium essentially depends only on the light amplitude transmitted by the mask. A collimating lens 50 is disposed between the filter and the recording medium. Lenses 48 and 50 may also be used to image the mask 44 at the holographic recording medium 33 with unity magnification.

In making the mask 44, the object can be rotated during exposure so that the magnitude of the reference beam at the recording medium has rotational symmetry.

It is to be recognized that while it is desirable to provide unity modulation for all spatial frequencies, in practice this is difficult to accomplish, but the described techniques provide a much smaller variation in modulation and will cause more spatial frequencies to contribute to the imaging on reconstruction. The contribution of more spatial frequencies and improved diffraction efficiency because of greater modulation and smaller variation in modulation for the spatial frequencies results in an improved reconstructed image over conventional practice even though there is a variation in modulation for the various spatial frequencies.

Figure 3:
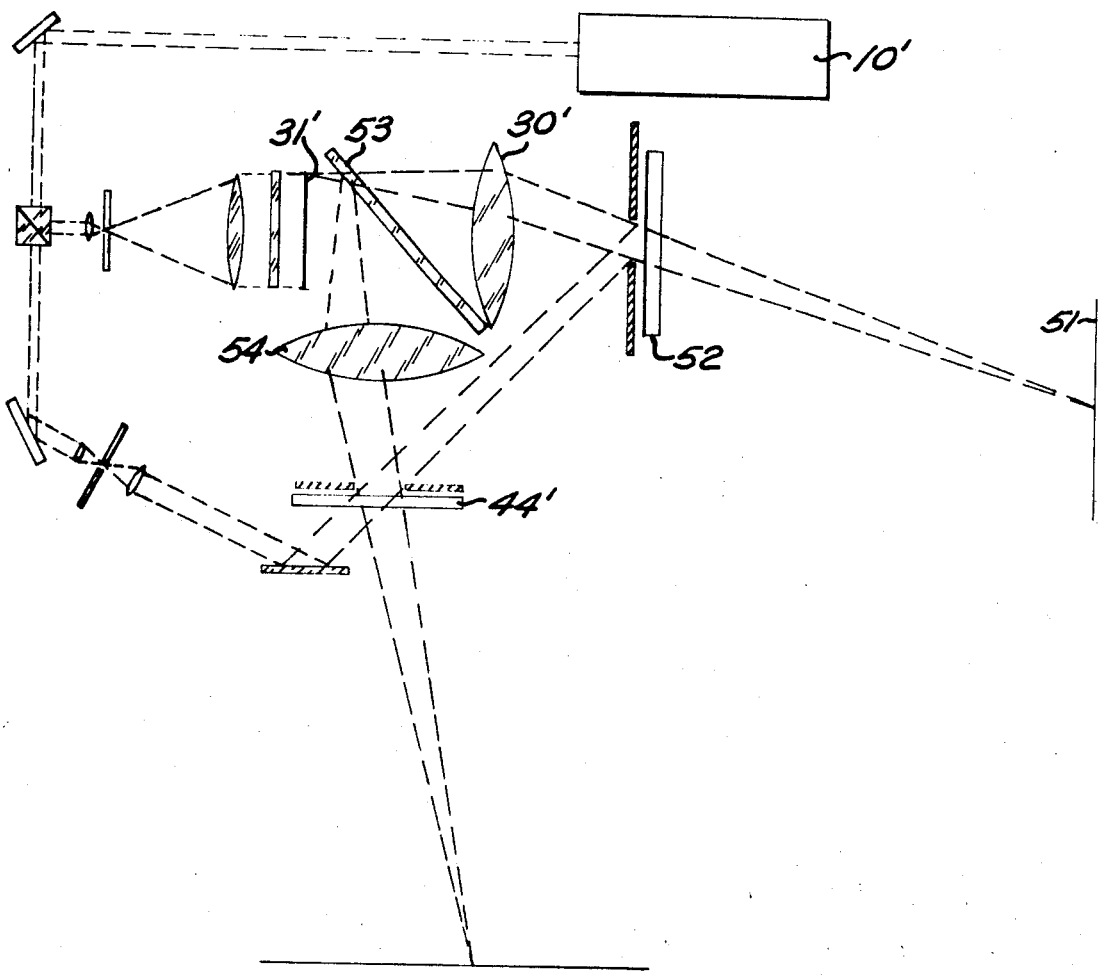
FIG. 3 is a diagrammatic showing of another specific holographic recording system for practicing the present invention.

In FIG. 3, a photochromic material or other self-developing material is utilized to provide a mask 44' in the reference beam, which mask performs the same function as the mask 44 of FIG. 1. The parts of FIG. 3 which correspond to elements shown in FIG. 1 have been given the same reference designation and a detailed description of these elements will not be repeated except where it clarifies the description of the elements or their functions differ from those of FIG. 1.

In the system illustrated in FIG. 3, the object 31' is located a distance from the lens 30' greater than the focal length of the lens and is imaged at an image plane 51. The recording is made in a near Fourier transform plane 52.

A beam splitter 53 is located in the signal beam between the object and the lens 30' and a portion of the beam is directed through an imaging lens 54 which corresponds in characteristics to the lens 30' and which images the object as in the case of lens 30'. The lens 54, the object, and the mask 44' are relatively located so that the photochromic material is disposed in the near Fourier transform plane for light from the object passing through the transforming lens 54. The plane in which the photochromic material is positioned corresponds to the plane 52 for the lens 30' so that the light distribution on the photochromic material and, in turn, the transmittance characteristics of the photochromic material, corresponds to the light distribution of the signal beam at the recording medium. As is known in the art, the light transmittance characteristics of photochromic material can be made to vary directly with the amplitude of the light illuminating the material.

The present invention also contemplates the weighting of the readout beam to compensate for residual variations in modulation and for other nonlinear characteristics. Weighting of the readout beam may also be used to produce more faithful reconstructions for holograms made in a conventional manner. For example, the non-weighted reference beam on recording may have a magnitude as indicated by the dashed line 60 in FIG. 2. The non-linearity of the recording medium in this case may result in saturation and a loss of the amplitude information for the low spatial frequencies. In accordance with the present invention, a mask may be constructed for weighting the readout beam in accordance with the characteristics introduced by the nonlinear characteristics of the recording. As will be appreciated by one skilled in the art, the necessary transmittance characteristics for the mask weighting the readout beam may be determined empirically to provide a higher amplitude readout beam in those areas of the hologram wherein non-linearity or saturation of the recording medium, or loss of diffracting efficiency would normally cause a degradation of the light amplitude for that area of the hologram.

The present invention recognizes that the signal beam may be weighted to provide smaller variation in the modulation for the spatial frequencies of the signal beam. In this case, a mask having transmittance characteristics which vary inversely with the amplitude of the spatial frequencies will be placed in the signal beam adjacent the recording medium. The mask is used in the Fourier transform plane of the object and this plane is imaged by a lens at a recording plane where the off-axis reference beam interferes with the signal beam and the hologram is recorded. Preferably the reference beam is adjusted in amplitude to provide approximately unity modulation. In such a system a mask with inverse transmittance characteristics relative to the first mask is used in the readout beam to preserve the relative amplitudes for the various spatial frequencies.

While the reference beam is a collimated beam in the illustrated embodiment, it will be recognized that other types of beams could be used and a lens system provided which images the mask on the recording medium. This would also be true in the situation where the readout beam is weighted.

What is claimed is:

1. In a method of constructing a hologram of an object on a recording medium located at or near the Fourier transform plane as the interference pattern between a signal beam of light obtained by illumination of the object and a reference beam of light arriving off axis relative to the signal beam, the step of
   amplitude weighting the light distribution in one of said signal beam and said reference beam with an approximation of the Fourier transform amplitude distribution of said object to suppress the effect on the interference pattern at the recording medium of large variations in amplitude of the light distribution in the signal beam primarily attributable to gross detail features of said object, and thereby tend to produce approximately unity light modulation of said interference pattern throughout the hologram.

2. The method according to claim 1, wherein
said gross detail features of said object include contrast in lightness and darkness between various portions of said object.

3. The method according to claim 1, wherein
said recording medium is self developing upon exposure to said interference pattern.

4. The method according to claim 1, wherein
said object is a transparency containing data to be holographically recorded.

5. The method according to claim 1, wherein
said amplitude weighting is carried out by shaping the amplitude of the light distribution in the signal beam prior to interference with said reference beam, by placing a mask having a light transmittance characteristic which produces considerable blockage of the larger amplitude variations, in the path of the signal beam between the object and the recording medium.

6. The method according to claim 1, wherein
said amplitude weighting is carried out by shaping the amplitude of the light distribution in the reference beam to more nearly match the amplitude of the light distribution in the signal beam.

7. The method according to claim 6, wherein
said shaping is performed by placing a mask having a light transmittance characteristic possessing said match in the path of said reference beam prior to interference with said signal beam.

8. In a method of reconstructing an image of an object from a hologram thereof recorded on a recording medium as an interference pattern between a signal beam of light obtained by illumination of the object and a reference beam of light incident on the recording medium off axis relative to the signal beam, wherein one of said signal beam and said reference beam were subjected to amplitude weighting of the light distribution thereon to suppress the effect on the interference pattern of large variations in amplitude of the light distribution pattern in the signal beam primarily attributable to gross detail features of the object, and wherein said reconstructing the image is performed by illuminating the hologram with a readout beam of light, the step of
   amplitude weighting the light distribution in the readout beam to substantially restore the effect of said large variations in amplitude of the light distribution in said signal beam to the light diffracted by the hologram, and thereby to restore said gross detail features of the object in the image thereof.

9. In a system for constructing a hologram of an object on a recording medium as the interference pattern between a signal beam of light obtained by illumination of the object and a reference beam of light incident on the recording medium located at or near the Fourier transform plane off axis relative to the signal beam, the combination comprising
   means for generating said signal beam and said reference beam,
   means for directing the signal beam and the reference beam onto the recording medium in interfering relationship, and
   means for amplitude weighting the light distribution in one of said signal beam and said reference beam prior to interference therebetween at said recording medium to suppress the effect on the interference pattern of large variations in amplitude of the light distribution in the signal beam primarily attributable to gross detail features of said object, and thereby tend to produce approximately unity light modulation of said interference pattern throughout the hologram.

10. The system according to claim 9, wherein said means for amplitude weighting is a mask with preselected light transmissive characteristics.

11. The system according to claim 10, wherein said mask is configured for amplitude weighting the light distribution in said signal beam by considerably blocking the passage of light in said signal beam at said large variation portions thereof.

12. The system according to claim 10, wherein said mask is configured for amplitude weighting the light distribution in said reference beam by passing light in said reference beam in a distribution pattern approximating the light distribution in said signal beam.

* * * * *